United States Patent Office 2,813,328
Patented Nov. 19, 1957

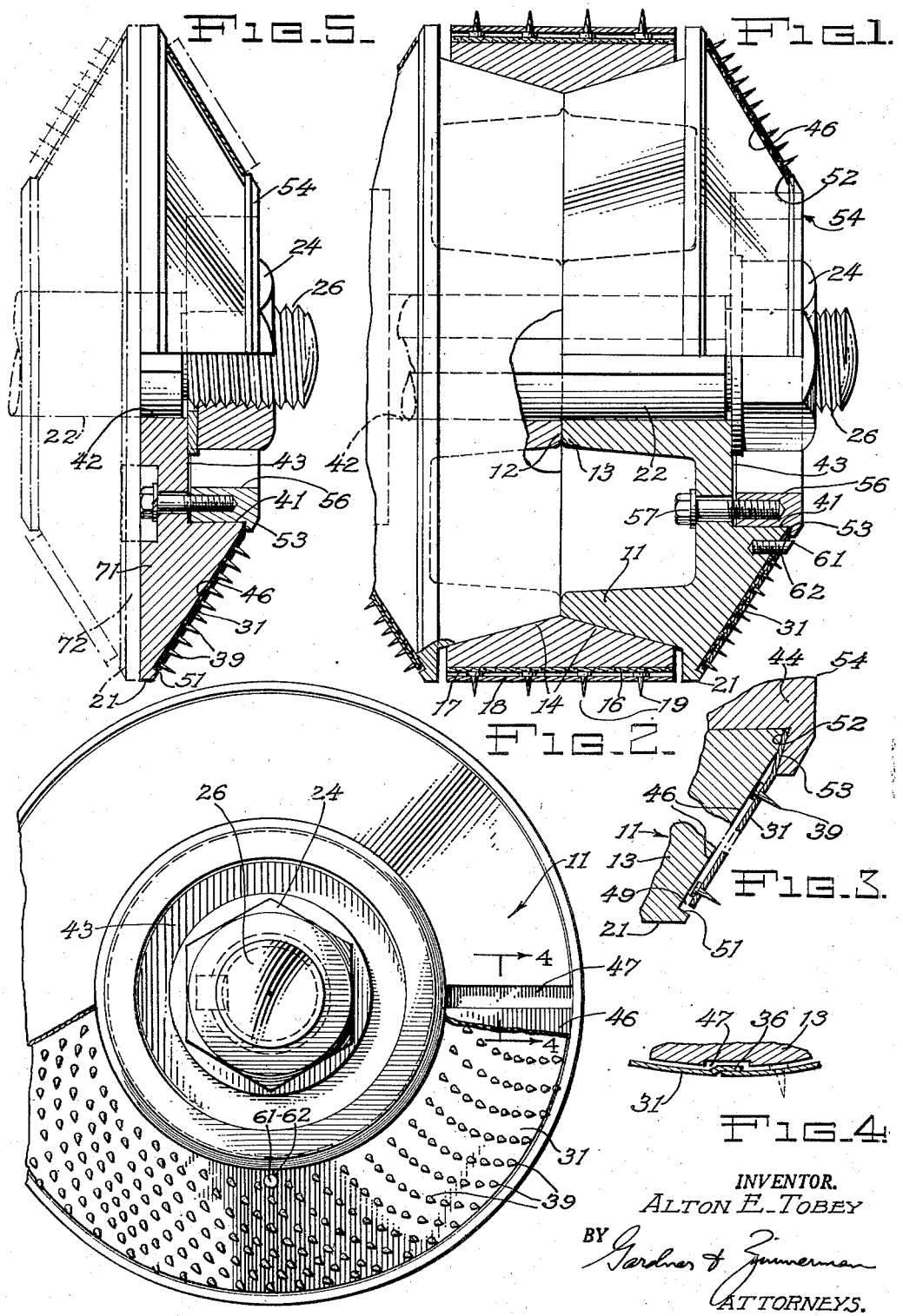

2,813,328

TIRE ABRADING DEVICE

Alton E. Tobey, Santa Cruz, Calif.

Application January 21, 1953, Serial No. 332,411

7 Claims. (Cl. 29—78)

This invention relates to devices for roughing the treads of rubber tires prior to retreading or recapping the same, and more particularly relates to a novel abrasive wheel casing and band therefor.

Tire abrading devices, commonly designated as rasps or rasp bands by the trade, have heretofore been constructed of generally cylindrical form, and arranged for mounting on a rotatable hub or drum element. A typical example is disclosed in my prior patent, No. 2,436,621, dated February 24, 1948. As will be understood, such devices are provided with radially extending sharpened prongs or the like, and by placing a tire adjacent the periphery of the rotating member, the tire may be roughened or ground down. This arrangement has been found reasonably adequate when only the treads or crown of the tire is being worked on, but difficulty is encountered in working on the side wall portions of the tire.

It is therefore an object of the present invention to provide a tire abrading device particularly adapted for engaging side wall portions of a tire.

Another object of my invention is to provide a device of the character described in which a generally conventional cylindrical rasp band for the tire crown may be utilized in combination with one or more auxiliary bands for the tire side walls.

A further object of this invention is to provide a device of the above type in which the auxiliary bands are of generally frusto-conical configuration and arranged to rotate about a common axis with the cylindrical rasp band.

A still further object of the invention is to provide an abrading device as hereinabove set forth in which novel means are provided for releasably securing the tapered bands to the rotatable hub element.

Yet another object of the invention is to provide a device of the character referred to in which the tapered bands will be substantially continuous and in which the outer peripheral surface thereof will present a smooth unbroken appearance.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevational view, partly in section, of my improved abrader.

Figure 2 is an end elevational view of the structure shown in Figure 1.

Figure 3 is an enlarged view of a portion of the structure disclosed in Figure 1.

Figure 4 is a cross-sectional view taken in the plane indicated by line 4—4 of Figure 2.

Figure 5 is a view similar to Figure 1, but illustrating a slightly modified form of an abrading device.

In abrading devices of the type disclosed in my above mentioned patent, as well as other devices available in the market, a plurality of tacks or abrading prongs are mounted on a band which in turn is secured to a rotatable hub or drum, and as is well known, the pointed ends of the tacks or prongs scrape against the tire during the abrading and/or buffing operation.

The abrading device of the present invention is designed for mounting on a drum or hub, generally designated by the numeral 11, which as here shown is formed of substantially identical half sections 12 and 13. The inner peripheral portions of the sections cooperate to define a V-shaped recess 14 arranged to receive a resilient backing member 16 for the conventional cylindrical abrading mechanism. This latter mechanism includes inner and outer bands, 17 and 18 respectively, between which the heads of tacks 19 are positioned with the prongs of the latter extending through apertures provided in the outer band. Opposed lugs 21 on the hub sections provide lateral stops for the backing member and bands. My prior Patent No. 2,436,621 discloses a preferable type of band construction, but as this feature forms no independent part of the present invention, no detailed explanation is deemed necessary for this application. It should be stated however, that the two sections 12 and 13 are mounted on a shaft 22 in any suitable manner and may be operatively secured together between a shoulder on the shaft and a nut 24 engaged with a threaded portion 26 of such shaft. In this manner, by imparting rotary movement to the shaft, the hub sections and their associated abrading prongs or tacks 19 will be likewise rotated.

While apparatus of the foregoing type of construction has been widely accepted and used by the trade; as has been previously mentioned, the use of a cylindrical type abrader or buffer will not permit rapid abrasion or buffing of the tire side walls. Accordingly, as the primary feature of this invention, there is provided in conjunction with the cylindrical abrading band 18, a pair of tapered bands 31 disposed on each of the hub sections. In view of the fact that both section bands are the same, only one of such bands is illustrated in the drawing.

The bands 31 may be formed by taking an annular flat piece of material and cutting a radial segment therefrom. With the slope shown in the drawing, this segment would comprise approximately 47 degrees of arc. After removing the segment, the ends of the material are overlapped with the end portions of the inner layer of material offset the thickness of the material, as indicated at 36 in Figure 4, and then welded together. As will be understood, when the ends are drawn together, the band will assume a frusto-conical form, the exact degree of slope depending upon the size of the removed segment. Suitable apertures are provided on the band with each of such apertures arranged to receive the shank of a tack 39, with the head of the latter disposed between the band and its respective hub section as will be presently explained.

Means are provided on the outer transaxial faces of the hub sections for receiving the respective bands 31, and for securing the bands to the hubs for subsequent rotation therewith. As here shown, the outer portion of each hub section is provided with a radially enlarged counterbore 41 in axial alignment with a bore 42 in which shaft 22 is disposed. Counterbore 41 provides a transaxial face 43 on the hub as well as a cylindrical shoulder 44, and as will be seen in Figure 1, the nut 24 may enter one of said counterbores for engagement with shaft 22, and likewise the shaft shoulder (not shown) may enter the other of said counterbores. It will be noted that shoulder 44 extends axially beyond the outer faces of lugs 21, and consequently, the respective hub sections are provided with a frusto-conical surface 46 extending therebetween, the slope of such surface substantially corresponding to that of bands 31.

Referring to Figures 2 and 4, it will be seen that a slot 47 is provided on the frusto-conical surface 46 to receive the lapped joint where the ends of band 31 are secured together. In this manner, the entire outer peripheral surface of the tire side wall abrading or buffing bands 31 will be smooth and continuous, without any abrupt angular offset portions appearing thereon.

It is of the utmost importance that the bands be securely locked to the hub sections, due to the large frictional forces created when the tack ends are in engagement with the rubber tire. The longitudinal outer edge of each band is disposed adjacent a recess 49 formed at the juncture of surface 46 and a shoulder 51 provided on lug 21. It is important to note that it is not necessary for the outer edge of band 31 to be seated in recess 49, for as will be presently explained, the other edge is positively clamped to the hub, and by having the angle of the band possibly 1 degree less than that of the hub, the outer edge will not have any tendency to leave its adjacent hub surface. The inner portions of surface 46 is tapered axially inwardly as indicated at 52, this taper matching a tapered radial shoulder 53 of a locking ring 54. Ring 54 is provided with an annular body portion 56 disposed within counterbore 41 and may be releasably secured to the respective hub sections by means of one or more lock screws 57 engaged with a threaded bore in the ring portion 56. As will be seen in Figure 1, the hub elements are each provided with annular openings affording access to the screw heads, and in this manner, the screws may be selectively engaged with or removed from the ring 54. It will also be observed that the ends of tacks 39 extend beyond lug 21 and the outer axial surface of ring 54, so that the latter members will not interfere with the placing of a tire against the abrader.

As hereinabove mentioned, the slope of the ring shoulder 53 and hub portion 52 is different from that of hub surface 46. Thus, when the band is placed on surface 46 and the ring locked in place, the inner annular portion of ring 46 will be crimped and clamped between portion 52 and shoulder 53, fixedly securing the band in place.

To further lock the bands against rotation relative to the hub sections, each of the latter is provided with a driver pin 61 extending axially outwardly from surface 46 and engageable in an aperture 62 in band 31.

From the foregoing description, the details of construction of my improved tire abrader or buffer will be clearly understood, and its method of operation will be also apparent to those skilled in the art. In general practice, the cylindrical abrading band 18 will support coarser tacks so as to permit a true abrading action on the heavier tread portion of the tire carcass, while the bands 31 will be utilized more for buffing the thinner side wall portions of the tire. It is also believed clear that by arranging the bands 31 in opposed sloping relationship, both of the tire side walls may be operated on in order with a minimum of movement of the tire.

If desired, and as indicated in Figure 5 of the drawing, the side wall bands may be constructed independently of the conventional cylindrical abrading band. In this case, the hub sections 71 and 72 will have a smaller axial depth with the lugs 21 disposed adjacent each other, and without the central recess 14. However, the remaining portions of the mechanism will be substantially identical to that described for the main embodiment of the invention.

I claim:

1. Apparatus of the character described including a pair of substantially symmetrical hub elements, said elements being provided with opposed annular shoulders and defining therebetween a recess for receiving a cylindrical abrading band, each of said sections having on their outer axial portions an annular generally transaxial surface of frusto-conical form with an axis disposed along the axis of its respective hub element and diverging towards the other of said hub elements, an annular lock ring on each element disposed adjacent the radial innermost portion of said surface and having an extension thereon overlying the latter, and means for releasably securing said rings to said elements.

2. Apparatus as set forth in claim 1 in which means are provided defining a groove extending axially along said surfaces.

3. Apparatus as set forth in claim 1 including a stud element extending generally axially from each of said surfaces.

4. Tire abrading apparatus including a pair of symmetrical hub members arranged to be secured together for rotation about a common axis, means on the peripheral portions of said members cooperating to define a recess arranged to receive a generally cylindrical rasp band, means on each of said members adjacent the axial outermost portions thereof defining an annular transaxial face of generally frusto-conical configuration with an axis coinciding with said common axis and with the smaller radial portion thereof directed axially outwardly, said faces being arranged to receive frusto-conical rasp bands thereon, an annular lock ring having means thereon overlying an annular portion of each of said faces, means on said hub members for releasably securing said rings to said hub members, and a band driving pin extending outwardly from each of said faces and arranged for insertion in said bands.

5. Tire abrading apparatus including an axially extending hub element having an end surface formed of frusto-conical configuration, a radial inner portion of said end surface being angularly offset from said surface, an annular lock ring disposed adjacent said portion and having an extension in parallel relation thereto, and means on said hub element including a recess for receiving a frusto-conical abrading band on said surface whereby a radial inner portion thereof may be crimped and clamped between said end surface portion and said lock ring.

6. Apparatus as set forth in claim 5 including a frusto-conical abrading band, the slope of the band cone relative to its axis being slightly less than the slope of said end surface relative to its axis.

7. Apparatus of the character described including an axially extending hub element having an axially outwardly converging frusto-conical end portion having an axial bore, an annular band-locking ring positioned within said end portion bore and having a shoulder portion thereof extending radially outwardly and over a radial inner portion of the outer surface of said end portion, and means on said end portion for axially moving said ring.

References Cited in the file of this patent

UNITED STATES PATENTS

| 925,457 | Cleveland | June 22, 1909 |
| 2,035,802 | George | Mar. 31, 1936 |
| 2,079,995 | Hodgkins | May 11, 1937 |
| 2,140,831 | Ecklund | Dec. 20, 1938 |
| 2,300,861 | Bacon | Nov. 3, 1942 |

FOREIGN PATENTS

| 667,658 | Germany | Nov. 17, 1938 |